United States Patent Office.

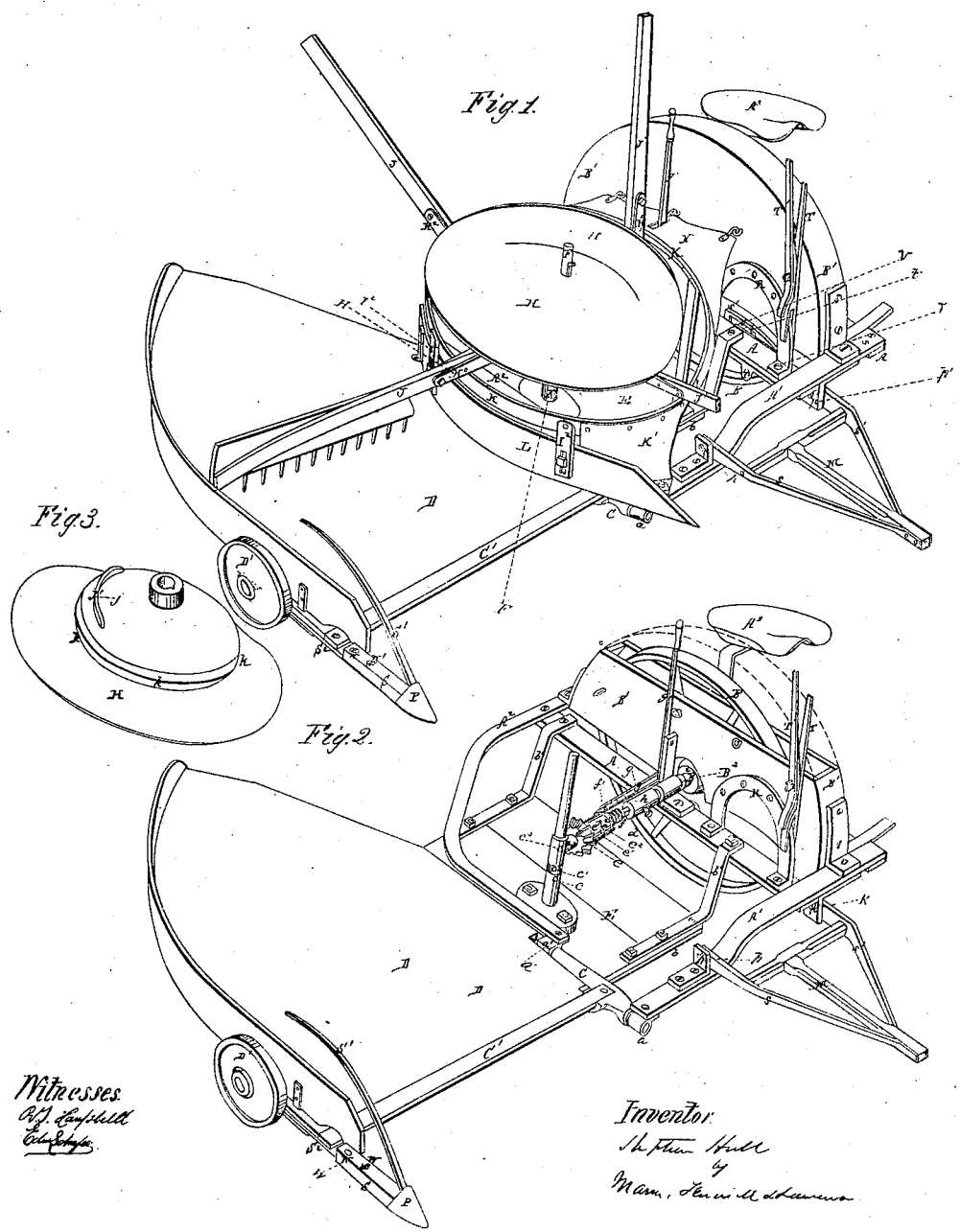

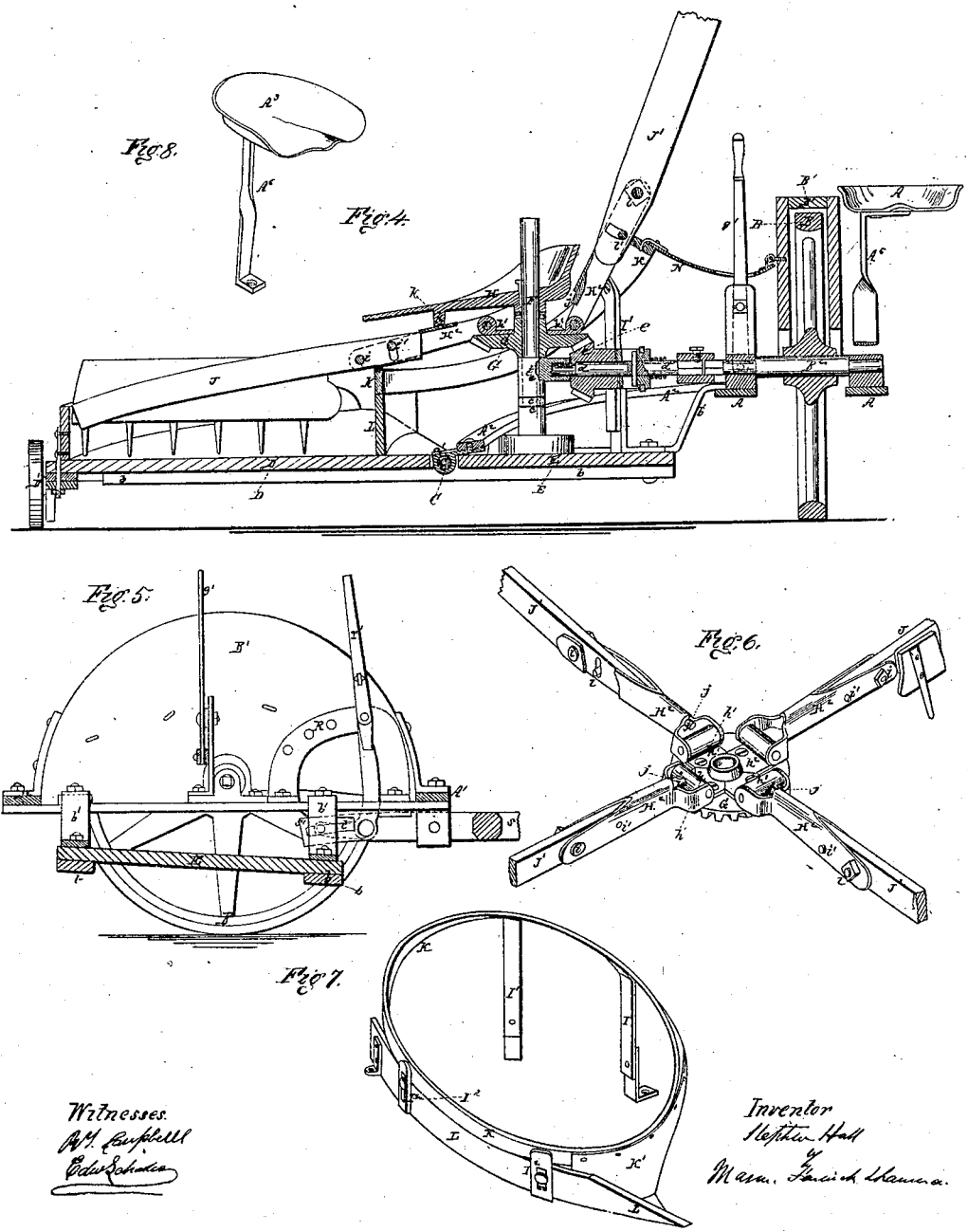

STEPHEN HULL, OF POUGHKEEPSIE, NEW YORK.

Letters Patent No. 81,090, dated August 18, 1868.

IMPROVEMENT IN HARVESTER-RAKES.

*The Schedule referred to in these Letters Patent and making part of the same.*

TO ALL WHOM IT MAY CONCERN:

Be it known that I, STEPHEN HULL, of Poughkeepsie, in the county of Dutchess, and State of New York, have invented certain new and useful Improvements in Harvesting-Machinery; and I do hereby declare that the following is a full, clear, and exact description thereof, reference being had to the accompanying drawings, making part of this specification, in which—

Figure 1, sheet 1, is a perspective view of the machine, with raking and reeling-devices attached.

Figure 2, sheet 1, is a perspective view, with the raking and reeling-devices, and inner grain-guard and divider removed.

Figure 3, sheet 1, is a bottom view in perspective of the cam and guard-plate, which cover the gearing of the raking and reeling-devices.

Figure 4, sheet 2, is a vertical section, taken through the driving-wheel, driving-gear, raking and reeling-devices, and platform.

Figure 5, sheet 2, is a longitudinal section, taken vertically through the auxiliary platform, showing a side elevation of the grain-side of the draught-frame.

Figure 6, sheet 2, is a perspective view of the rake and reel-arms hinged to their bevel-spur wheel.

Figure 7, sheet 2, is a perspective view of the cam-rail, with grain-guard and inner divider attached.

Figure 8, sheet 2, is a perspective view of the driver's seat and its double-acting spring-support.

Similar letters of reference indicate corresponding parts in the several figures.

This invention relates in part to certain novel improvements on the single driving-wheel and rigid finger-bar harvesters, having a revolving raking and reeling-attachment.

The invention provides for supporting the standard or post, around which the rake and reel-arms revolve, upon a platform, which is interposed between the grain-platform or receiver and the main draught-frame, so that said rake and reel-arms shall have plenty of space to sweep over the whole of the grain-platform, and revolve around their post without interfering with a person mounted upon the draught-frame, as will be hereinafter described.

The invention also provides for communicating motion from the axle of the transporting-wheel of the draught-frame to the spur-wheel, which carries the rake and reel-arms around a post or standard by means of an intermediate pinion-shaft, carrying a clutching and a coupling-device, and having its outer end supported by an adjustable bearing or sliding box upon said post, which bearing or box will admit of keeping this pinion-shaft in line with the driving-axle, as will be hereinafter described.

It further provides for controlling the movements of the rake and reel-arms in their revolutions around their fixed post, by means of cam-shaped projections upon the bottom side of a covering-plate or guard upon said post, in such manner that one of said cams will successively press the reel-arms downward into the standing grain as these arms are brought around to the proper place, and then allow them to rise while passing over the cut grain upon the platform, while the other cam will keep the rake close to the platform while sweeping over it, without causing it to drag thereon, as will be hereinafter described.

It also provides for so constructing the cam-rail, upon which the rake and reel-arms travel in their revolution around a fixed post, and the inner divider, that those parts shall conjointly serve as a grain-guard for preventing the cut grain or other substance from getting tangled with the gearing under the rake and reel-arms, at the same time said guard shall serve as a means for gathering and guarding the grain upon the grain-platform, as will be hereinafter described.

It also provides for housing in the grain-side of the driving-gear for the rake and reel-arms, and also covering said gearing so as to protect it from loose grain or straw, without interfering with the revolving and the rising and falling movements of said arms, as will be hereinafter described.

It further provides for covering the upper portion of the transporting-wheel, and all that part of the machine which is between the cam-rail and the draught-frame, so as to guard against the entrance of flying grain or straw, and at the same time provide for ready access to said covered parts for lubricating them, as will be hereinafter described.

It also provides for communicating motion to a bevel-spur wheel which has a number of rake and reel-arms pivoted to it, and which is applied to a stationary post, having its support below the draught-frame, and upon the grain-side thereof, through the medium of a pinion-shaft, which is coupled to the axle of the transporting-wheel at one end, and supported by said fixed post at the other end, and which is provided with means by which the rake and reel-arms can be stopped and started at pleasure while the machine is being drawn forward, as will be hereinafter described.

It also provides for attaching the rake and reel-arms to the bevel-spur wheel, by which these arms are revolved around a fixed post, by means of metal holders, so constructed as to form ears for receiving the eyes on said wheel, to which the arms are pivoted, and also to form jaws for receiving the rake and reel-arms, and allowing these arms to be adjusted and set at different angles so as to traverse in different planes over the grain-platform, as may be required.

It also provides for so constructing a single spring that, while it will serve as a substantial elevated support for a driver's seat, it will also allow a forward and backward and a lateral springy motion to said seat, and thereby protect a person sitting thereupon from unpleasant concussions during the operation of harvesting, as will be hereinafter described.

To enable others skilled in the art to understand my invention, I will describe its construction and operation.

The draught-frame A is sustained by means of a single transporting and driving-wheel, B, the upper portion of which is enclosed by means of a box or housing, $B^1$, which is secured at its front and rear ends to said frame by means of angle-irons, as shown in the drawings, figs. 1, 2, 4, and 5.

The draught-frame A consists of two longitudinal bars, connected together at their front and rear ends by transverse bars $A^1 A^2$, which project from the grain-side of said frame, and form braces for a rocking-shoe or bar, C.

The front brace $A^1$ extends outward and downward at right angles to the longitudinal bars of the frame, and has an eye-bearing, $a$, on its outer end for receiving the front end of the shoe C, and the brace $A^2$ extends outward and forward, and has an eye-bearing, $a'$, upon its end for receiving the rear end of said shoe.

To the shoe C the finger-bar $C^1$ is bolted, so that when the machine is used for mowing, a vibrating finger-bar is obtained, which is properly braced against the pressure brought upon it.

The braces $A^1 A^2$ also afford a large space between the shoe C and the draught-frame, for receiving a revolving raking and reeling-apparatus when the machine is employed for reaping.

D represents the grain receiver or platform upon which the cut grain falls, which is made of a segment-form, and provided with an outer guard and divider, and also with an inner divider and grain-guard. This platform D is mounted upon a wheel, $D'$, at its outer end, which will admit of this end being raised and lowered, and at its inner end it is supported by transverse strips or battens $b$ $b$, which extend inward a sufficient distance to have secured upon them an auxiliary platform, E, which latter is sustained by means of rigid pendants $b'$ $b'$, which are secured to the grain-side longitudinal bar of the draught-frame.

By removing the bolts which secure the pendants $b'$ $b'$ to the draught-frame, and detaching the grain-platform D from the finger-bar, the machine can be used as a mower.

It will be seen, by reference to fig. 2, that the auxiliary platform E is located between the grain-platform D and draught-frame A, below this frame, and within the space bounded by the draught-frame and braces $A^1$ $A^2$, and shoe C, and that it affords a support for a perpendicular post, F, around which the rake and reel-arms revolve.

This post F is constructed with a shoulder at $c$, upon which is a washer, $c^1$, and upon this washer rests a tubular bearing, $c^2$, in the horizontal portion of which turns a pinion-shaft, $d$, shown in figs. 2 and 4.

On top of the tubular bearing is a bevel-spur wheel, G, to which the rake and reel-arms are pivoted, and on top of this wheel G is a cam-plate, H, which latter may be secured down in place by a key or other suitable means.

The shaft $d$ has a pinion-spur wheel, $e$, applied loosely upon it, the teeth of which engage with the spur-wheel G on the post F.

The hub $e^1$ of this pinion is notched, and forms, in conjunction with a longitudinally-sliding collar, $e^2$, which is also notched and applied, so as to turn with shaft $d$, a clutching-device, by means of which the pinion-wheel $e$ can be caused to turn with shaft $d$, or this shaft allowed to turn independently of it, as may be required. A spring, $f$, keeps the clutch-collar $e^2$ engaged with the hub of wheel $e$, and a yoke, $f'$, with connecting-rod $g$, and lever $g'$, enables a person sitting upon the seat $A^3$, to stop the movements of the rake and reels at pleasure.

The pinion-shaft $d$ is connected to one end of the axle $B^2$ of the transporting-wheel B by means of a coupling-box, $h$, which receives the square end of the axle $B^2$, and is held in place on the shaft $d$ by a set-screw, as shown in figs. 2 and 4. By thus attaching the pinion-shaft to the axle of wheel B, at one end, and sustaining it by a vertically-adjustable bearing, $c^2$, at the other end, this shaft $d$ can be kept in line with the said axle, whether the platforms E and D be adjusted higher or lower to suit different heights of grain, and the spur-wheels can be thus made to run without binding.

Four eye-pieces, $h^1$ $h^1$ $h^1$ $h^2$, are secured upon the upper side of the bevel-spur wheel G, at regular distances apart, and at right angles to each other, and to these eyes the rake-arm J and reel or gathering-arms $J'$ are pivoted, so that these arms may vibrate vertically with freedom.

The mode of hinging the rake and reel-arms to said wheel G, is clearly shown in figs. 4 and 6. Each one of said arms is secured at one end between two jaws of a metal hinging-piece, $H^2$, by means of a clamping-bolt, $i$, and a pin, $i'$, which latter passes through a slot made through the arm, and serves as a guide for allowing this arm to be adjusted and set at different angles with respect to its hinging-piece. The two ears or jaws upon the hinging-end of piece H² receive the pin through them, which pivots this piece to its eye upon the wheel G. Each one of the hinging-pieces H² of the reel or gathering-arms, has a projection, j, in the crotch of its hinging-jaws, which is acted upon by the short segment-cam j', shown in fig. 3, sheet 1, as these arms commence their gathering-strokes, which cam will press the arms downward into the standing grain, until the arms pass over the grain-platform, when they will no longer be acted upon by said cam or segment. The hinging-piece H² of the rake-arm J has no projection j upon it, consequently the cam j' will not hold the rake-arm down, but, on the contrary, it will be allowed to rise while passing beneath this cam, so as not to operate as a reel or gatherer. The cam j' is secured to the bottom side of an elliptical guard, H, which is secured upon the post F, so as to cover the space above the gear-wheels G and e, and protect them from flying straw. Another cam or projecting rib, k, is formed on or secured to the bottom side of the guard-plate H, as shown in figs. 3 and 4, for the purpose of holding the rake down in working position while sweeping the cut grain from the platform.

This guard H with its cam-ribs can be raised or depressed upon its post F, and secured in any desired position by means of washers and a key, as shown in fig. 4.

The rake and reel-arms move around upon an elliptic cam-rail, K, which is arranged in an inclined plane, as shown in the drawings, for the purpose of causing the rake and reel-arms to rise nearly to upright positions after sweeping over the grain-platform, so as not to interfere with a person sitting upon the seat A³.

This elliptical rail is supported upon the auxiliary platform E by means of vertically-adjustable standards, I¹ I¹, and also upon the inner curved divider L, by vertically-adjustable plates, I², as shown in figs. 1 and 7. The divider L extends back beneath the grain-side of the rail K, nearly half way around this rail, and forms, in conjunction with it, a guard or fender, which will prevent any of the cut grain or straw from getting into the space occupied by the gearing.

In front of the elliptical railway K, a shield, K', is secured, which prevents the entrance of straw or other foreign substances at this point, as clearly shown in figs. 1 and 7.

The rake and reel-arms will carry up with them more or less straw as they rise after every working-stroke, which straw will fall from them in their forward movements. To protect the gearing from this falling straw, the elliptical covering-plate H is used, but this plate will not shield that portion of the shaft d which extends outside of the space covered by it. I therefore use a flexible covering or apron, N, which is hooked upon the rail K, along one edge, and also hooked to the housing B¹ of the transporting-wheel B, as shown in figs. 1 and 4. This covering is removable, for the purpose of getting at the parts protected by it, for oiling or repairing them.

The draught-pole M is hinged at $p$ $p^1$ to the transverse brace A¹, of frame A, by means of two braces or "pole-irons" $s$ $s'$, one of which, $s$, extends back, and has an oblong curved slot, $t$, made through it, in which slot a stud, $v$, works, that is on the lower curved end of a vibrating hand-lever, T. This lever T is pivoted to the draught-frame at $r$, and extends up so as to be convenient to a person sitting upon seat A³. It is provided with a spring-pivoted arm, T', which has a stud upon its lower end, that catches into one or the other of the holes through the fixed segment R, and enables the driver, sitting upon his seat, to raise or depress the front part of the draught-frame and the finger-bar, according to the height of cut desired, while the machine is in operation.

The outer divider consists of a bar, S, which carries on its front end a hollow pointed shoe, P, to which an elastic curved strip, S¹, is secured, as shown in figs. 1 and 2. This strip extends upward and backward, and serves to direct the grain upon the platform. The bar S¹ is pivoted at $w$ to a projection, S², and secured in place by means of a screw or clamping-bolt, $w'$, which passes through a slot made through said bar, S, so as to allow the shoe and its strip to be adjusted laterally and secured in any desired position.

It will be seen, from the above description, that I have a single-wheel draught-frame with the platform and finger-bar rigidly attached to it, yet capable of being raised and depressed for high or low cutting; also, that I provide for protecting the raking and reeling-devices, and also the driving-wheel shaft, from becoming entangled and clogged with grain or straw; also, that I provide an auxiliary platform, inside of the grain-platform, for sustaining the rake and reel-post, and its attachments; also, that I provide for holding the reel or gathering-arms down while pressing in the standing grain to the sickle, at the same time allowing the rake to rise, so as not to operate as a reel or gatherer; also, that I am enabled to adjust the rake and reel-arms upon their hinging-irons, so as to have said arms operate at any desired angle required.

I also provide for adjusting the outer bearing-box of the pinion-shaft so as to keep it in line with the axle of the driving-wheel, to which it is attached by a coupling-box; and I also provide for enabling the attendant to stop and to start the rake and reel-arms at pleasure, while the machine is advancing or turning.

In figs. 4 and 8, I have represented the driver's seat, A³, mounted upon a spring-standard, A⁶, which consists of a flat strip of steel or spring-metal, having its upper portion twisted at right angles to its lower portion; that is to say, I take a strip of metal, of proper length and strength, and twist it so that one part of it will allow the seat to have a springy movement in two directions. This makes a very simple and desirable seat-support, and makes the single standard serve as a spring-support for the seat.

Having described my invention, what I claim as new, and desire to secure by Letters Patent, is—

1. The intermediate platform E, placed between the grain-platform and draught-frame, and having mounted upon it the rake and reel-post F, substantially as described.

2. The cam-plate H, the spur-wheel G, and the adjustable journal-box C² applied upon the post F, in combination with the pinion-shaft $d$ and driving-wheel B, substantially as described.

3. The closed cam-plate H, constructed to operate upon the reel and rake-arms, as described, and extended to or nearly to the inner surface of the cam-rail K, so as to serve as a top shield for the rake and reel-gearing.

4. The cam-projection $j'$, arranged as described, in combination with the projections $j$ upon the pivoted reel-arm hinging portions $H^2$, substantially as described.

5. The construction of the cam-rail K, inner divider L, and the device K', so that these parts unite and form conjointly a continuous closed shield at the inner front corner and inner edge of the platform, as shown, and thus serve for keeping the loose straw and other obstacles from getting under the cam-plate H, as set forth.

6. The combination of the side shield L and the extended closed cam-plate H, the same being constructed and arranged substantially as shown and described.

7. The removable apron N applied to the bearing $B^1$ and cam-rail K, substantially as and for the purposes described.

8. Shaft $d$, supported at one end by a sliding bearing, $c^2$, on post F, and connected at the other end to the axle of the wheel B by a coupling-box, $h$, in combination with the pinion $e$, and a clutching-device, substantially as described.

9. The slotted and pivoted extended brace $s'$, applied on the side of the tongue or pole M, and serving to brace the same, and also serving as a means for raising and lowering the same, in combination with the vibrating latching-lever T and segment R, the whole substantially as herein described.

10. A combined revolving reel and rake, mounted on a support, which is on the intermediate platform E of a harvester, such combined reel and rake having its arms hinged to one head, which revolves independently of the support, and also has its arms guided and controlled by a cam, or cam and guide-rail, in their movements over the grain-platform, and turned up at intervals to nearly an upright position in rear of their support or axis, the shaft or axis of said reel and rake being vertical, or nearly so, substantially as and for the purpose described.

11. The combination of a vertical shaft, which has its support on platform E of the harvester, a cam guideway and reel and rake-arms combined, which revolve independently of the vertical shaft, all substantially as and for the purpose described.

12. The construction of a seat-standard, $A^6$, of a strip or piece of spring-metal twisted, substantially as and for the purpose described.

STEPHEN HULL.

Witnesses.
   ROBT. N. PALMER,
   H. D. VARICK.